United States Patent [19]

Hamann et al.

[11] Patent Number: 5,457,729
[45] Date of Patent: Oct. 10, 1995

[54] COMMUNICATION NETWORK SIGNALLING SYSTEM LINK MONITOR AND TEST UNIT

[75] Inventors: Gary L. Hamann, Freemont; Robert P. Hamilton, Sunnyvale, both of Calif.

[73] Assignee: Symmetricom, Inc.

[21] Appl. No.: 385,066

[22] Filed: Feb. 7, 1995

Related U.S. Application Data

[63] Continuation of Ser. No. 31,696, Mar. 15, 1993, abandoned.
[51] Int. Cl.$^6$ ............................. H04M 1/29; H04M 3/08; H04M 3/22; H04J 1/16
[52] U.S. Cl. .................................. 379/2; 379/12; 379/32; 379/34; 370/13; 370/17
[58] Field of Search ............................. 379/1, 10, 12, 379/14, 22, 16, 27, 29, 32, 2, 34, 49; 370/13, 17, 62.1, 110.1, 14, 15; 381/20.1

[56] References Cited

U.S. PATENT DOCUMENTS

4,870,638  9/1989  Kawano et al. .................. 370/17 X
5,195,124  3/1993  Ishioka .................................. 379/8 X Primary Examiner—Stephen Chin
Assistant Examiner—Paul Loomis
Attorney, Agent, or Firm—Spensley Horn Jubas & Lubitz

[57] ABSTRACT

A communication network signalling system couples a signal transfer point to a plurality of channel banks through links which include link monitor and test units. The link monitor and test units, which monitor the links in a passive, non-obtrusive manner and which at the same time are capable of being serially coupled into the link so as to insert signals in series with the link and to otherwise accomplish in-depth link testing and analysis, each include a pair of channel units coupled to opposite portions of an associated link and which are coupled together through a metallic through connection in the form of a normally unenergized relay. The metallic through connection provided by the relay maintains the signal path through the link during a variety of fault conditions, while at the same time permitting electronic portions of the channel units to be cross-connected to accomplish monitoring and testing functions. Each channel unit includes a dataport or other interface capable of coupling to the interface of the other channel unit as well as to monitor and test equipment, and which is coupled to the link through a high impedance to provide isolation of the link therefrom.

18 Claims, 7 Drawing Sheets

COMMUNICATION NETWORK SIGNALLING SYSTEM LINK MONITOR AND TEST UNIT

This is a continuation of application Ser. No. 08/031,696, filed Mar. 15, 1993, now abandoned.

BACKGROUND OF THE INVENTION

1. Field of the Invention

The present invention relates to communication network signalling systems, and more particularly to apparatus for monitoring and testing links within a communication network signalling system.

2. History of the Prior Art

Various different signalling systems are used in communication networks such as telephone networks. Originally, most signalling systems were of the in-band type in which detection of an off hook condition resulted in a switch securing a trunk, and then a line, and so forth. Signalling was accomplished on voice trunks. In time, in-band signalling systems proved to be inefficient, among other reasons because a call to a telephone that turned out to be busy tied up a considerable amount of equipment unnecessarily. This led to the advent of common channel or out-of-band signalling systems.

Most present day telephone networks employ common channel signalling systems which provide a high speed digital network. Such systems employ a number of common components including service switching points (SSPs) which comprise local switches for initiating signalling and for generating the signalling system protocol. Signal transfer points (STPs) serve to route the messages. Service control points (SCPs) comprise databases which are used in such systems. In some signalling systems, each service switching point is connected to two signal transfer points. Such dual or redundant connections prevent the loss of a single node due to fault or error conditions from rendering much or all of the network inoperative.

In spite of the dual or redundant interconnections of components within most common channel signalling systems, such systems are not without monitor and test problems. The protocol of such signalling systems includes message signal units (MSUs) which, among other functions, provide switching instructions in the event of a fault. In certain situations, a minor fault or failure has been known to produce a large number of maintenance signalling units which proceed to flood the network and shut down much of the entire system. Such catastrophic failures have shut down telephone networks covering large portions of major metropolitan areas, in recent years.

Within common channel signalling systems, the various components are connected by various different connections or links. For example, a signal transfer point may be coupled by links to a plurality of D4 channel banks, which in turn are coupled to other components. It is desirable to be able to monitor conditions within the various links. To do this, the signal transfer point is sometimes coupled to the channel banks through an integrated digital service terminal (IDST) which is a multiplexor/demultiplexor capable of providing electronic cross-connections. This type of connection provides test access for monitoring and testing the links, but with the disadvantage that the integrated digital service terminal is connected in series with and becomes an active element within the link. As such, problems within the integrated digital service terminal can directly affect the link.

It is also common practice to couple an integrated digital service terminal as an active element within the links between signal transfer points. In such arrangements, the links are used to couple one signal transfer point to the integrated digital service terminal through DSO dataports at an input side of the integrated digital service terminal. The integrated digital service terminal which has a test access interface and a matrix for providing desired interconnections is also provided with T1 cards at an output side thereof for coupling via links to a second signal transfer point.

In addition to integrated digital service terminals, still other components are sometimes coupled in the link between a signal transfer point and a D4 or similar channel bank. For example, intelligent patch panels are sometimes included. Such patch panels may include a keyboard controlled terminal for automatic connection to a selected one of a plurality of jacks so that test equipment can be properly interconnected.

The frequent connection by links of a signal transfer point to D4 or similar channel banks in signalling systems has emphasized the need to monitor and test such links in view of the fact that channel banks such as the D4 channel banks tend to be relatively trouble prone. However, it would be desirable to be able to advantageously monitor and test links at any location within a signalling system. Ideally, a link monitor and test arrangement should be a passive element which is basically transparent to the link and which does not interfere with link operation, except when the need arises to enter the series connection of the link for purposes of in-depth testing. Such apparatus should provide a test interface capable of monitoring the link in a non-obtrusive manner while at the same time being capable of inserting signals in series with the link for in-depth link testing and analysis.

BRIEF SUMMARY OF THE INVENTION

The above noted objects are accomplished by the provision of link monitor and test units for use in communication network signalling systems, in accordance with the invention. Such link monitor and test units are capable of monitoring links in a passive, non-obtrusive manner, while at the same time being capable of inserting signals and otherwise becoming an active element in series with the link for purposes of in-depth link testing and analysis.

Link monitor and test units in accordance with the invention are comprised of a pair of channel units which are coupled to the link as well as to each other. The channel units are coupled to each other using a metallic through connection which maintains the signal path during any fault condition such as common equipment failures, A and B battery feed loss, composite clock feed loss, and other malfunctions. At the same time, the electronic portions of the channel units are cross-connected to provide a fail-safe path as well as monitor and test access functions.

The metallic through connection between the channel units within the link monitor and test unit preferably comprises a relay in a normally unenergized state. In this way, the metallic connection between channel units is provided in order to maintain the link, except when it is safe to interrupt the metallic through connection for in-depth testing, in which event the relay is energized to interrupt or open the metallic through connection.

The channel units may each comprise a dataport coupled to a portion of the link via a high impedance in order to isolate the dataport from the link while at the same time providing electronic connection of the dataport to the link. The link monitor and test unit may comprise a part of an integrated digital services terminal or other terminal having equipment for monitoring and testing the link. The monitor and test equipment may include a matrix coupled to the channel units in combination with a protocol analyzer and a link monitor.

BRIEF DESCRIPTION OF THE DRAWINGS

A better understanding of the invention may be had by reference to the following specification in conjunction with the accompanying drawings, in which.

DETAILED DESCRIPTION OF THE INVENTION

Figure 1:
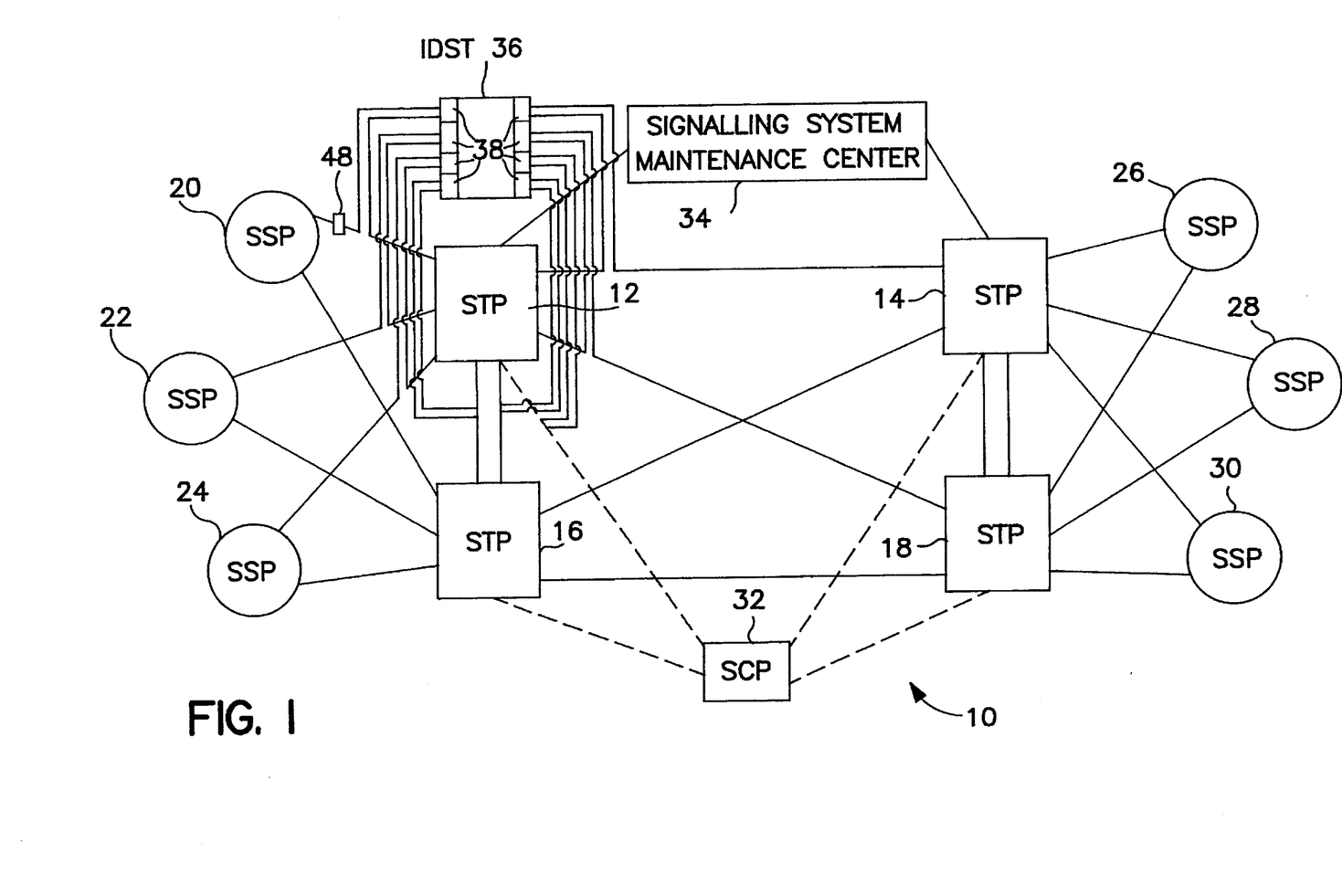
FIG. 1 is a block diagram of a common channel signalling system in which link monitor and test units in accordance with the invention are used.

FIG. 1 shows a typical arrangement of a common channel signalling system 10 for a communication network, such as a telephone network, in which link monitor and test units in accordance with the invention may be utilized, as described hereafter. The system 10 includes a plurality of STPs (signal transfer points) with four such STPs 12, 14, 16 and 18 being shown in the example of FIG. 1. The STPs 12, 14, 16 and 18 function to route messages to various components within the system 10. The system 10 includes a plurality of SSPs (service switching points) which are local switches for initiating signalling and for generating protocol. The example of FIG. 1 includes six SSPs 20, 22, 24, 26, 28 and 30. Each of the SSPs 20, 22, 24, 26, 28 and 30 is coupled to two of the STPs 12, 14, 16 and 18. For example, the SSP 20 is coupled to the STP 12 and to the STP 16. The connection between two STPs and between each STP and an associated SSP contains a plurality of components, including a channel bank 48 as shown between the STP 12 and the SSP 20. With such dual or redundant connections, the loss of a node due to a fault or error condition will not shut down the entire system 10.

The system 10 of FIG. 1 includes an SCP (service control point) 32 which provides databases for the system 10. The SCP 32 is coupled to each of the STPs 12, 14, 16 and 18, as shown by dashed lines in FIG. 1. The system 10 also includes a signalling system maintenance center 34 which is shown being coupled to the STPs 12 and 14. The maintenance center 34 serves to generate maintenance messages for the system 10 when problem conditions arise within the system 10.

As shown in FIG. 1, each of the STPs 12, 14, 16 and 18 is coupled to the other STPs so that direct communication is possible between the various STPs. In spite of the dual or redundant connections of the SSPs 20, 22, 24, 26, 28 and 30 to various ones of the STPs 12, 14, 16 and 18, error conditions can still arise which can result in the disabling of a substantial portion or all of the system 10. For example, certain error conditions can cause one of the STPs 12, 14, 16 or 18 to go into a streaming mode in which large numbers of random maintenance messages are generated which can corrupt the system 10. The excess generation of maintenance messages can result in other nodes within the system 10 generating even more messages which eventually find their way back to the offending STP. This causes even more maintenance messages to be generated, resulting in network overload and crash.

To isolate a streaming STP so that the entire communication network does not overload and crash, an IDST (integrated digital service terminal) can be coupled to each STP. In the system 10 of FIG. 1, an IDST 36 is shown in conjunction with the STP 12. When used with an STP, an IDST is typically coupled in series with the links extending from the STP. The IDST therefore has the ability of opening or breaking the various links leading from the STP when it becomes necessary to do so. In the case of the IDST 36, this is represented in FIG. 1 by a plurality of blocks 38 which comprise part of the IDST 36. The blocks 38 can comprise switches, contacts or other elements for selectively breaking or connecting the links of the STP 12.

The IDST 36 enables the links of the STP 12 to be split, rerouted, or looped back, to isolate, test and debug streamers of the STP 12. This enables a streaming STP to be effectively cut out of the system without losing the conditions that led up to the failure. At the same time, removal of the offending STP from the system prevents network overload and crash.

Figure 2:
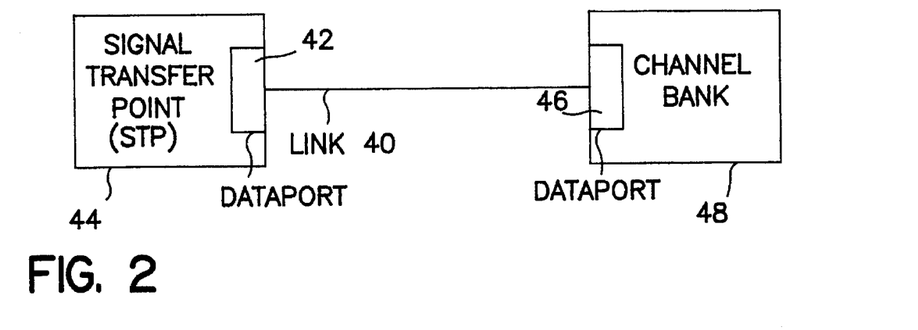
FIG. 2 is a block diagram of a portion of a signalling system such as the system of FIG. 1 showing the manner in which a signal transfer point is coupled by a link to a channel bank.

Within a signalling system, an STP typically has 40–80 links and can have as many as 250 links. Typically, the links are coupled between a dataport interface of the STP, such as a DS0 dataport card, and other components such as SSPs (as shown in FIG. 1) through a plurality of channel banks such as D4 channel banks. This is shown in FIG. 2 in which a link 40 couples a dataport 42 of an STP 44 to a dataport 46 at the input of a channel bank 48. If an IDST is coupled into the links of an STP, such as the link 40 of the STP 44 shown in FIG. 2, then the IDST provides for the transition from the DS0 rate of the dataport 42 to the DS1 rate and the T1 carrier for entry into the network. This also provides for test access so that the links can be examined without interfering with them.

Figure 3:
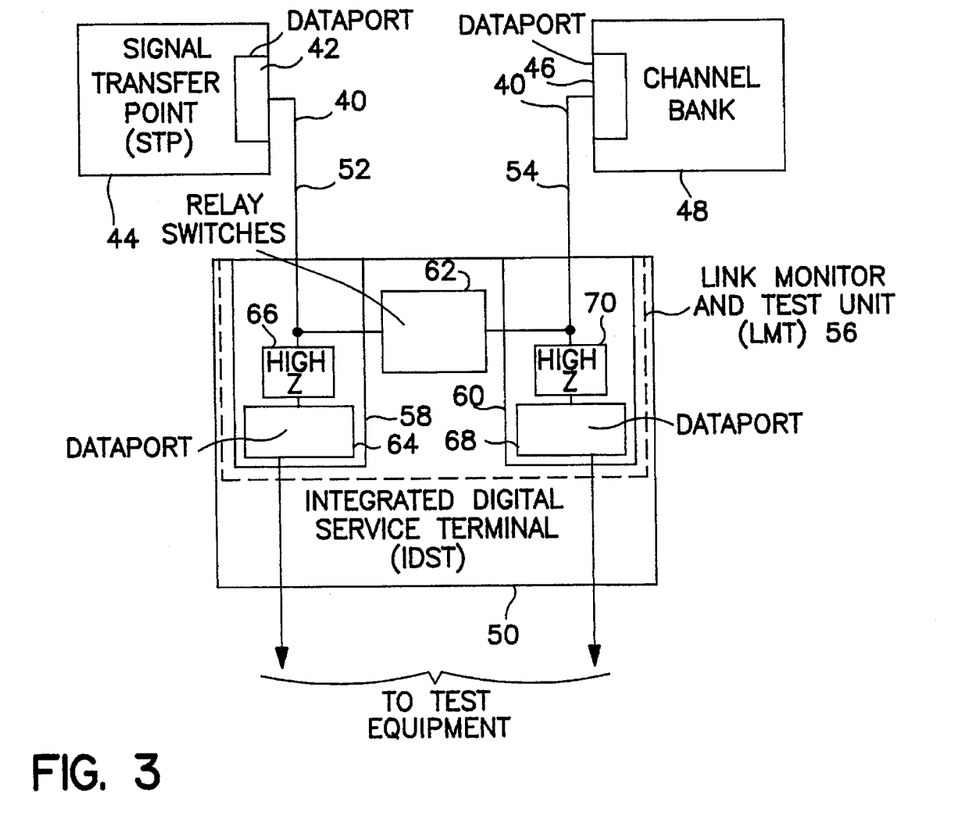
FIG. 3 is a block diagram of a link monitor and test unit coupled to the link between the signal transfer point and the channel bank of the arrangement of FIG. 2, in accordance with the invention.

An example of a terminal being coupled in the link 40 of the arrangement of FIG. 2 in accordance with the invention is shown in FIG. 3. In the arrangement of FIG. 3, the terminal comprises an IDST 50 serially coupled between opposite portions 52 and 54 of the link 40. The portion 52 of the link 40 couples the IDST 50 to the dataport 42 of the STP 44, while the portion 54 of the link 40 couples the IDST 50 to the dataport 46 of the channel bank 48.

Within the IDST 50, the portions 52 and 54 of the link 40 are coupled to an LMT (link monitor and test unit) 56. The LMT 56 includes a first channel unit 58 to which the portion 52 of the link 40 from the STP 44 is coupled. The LMT 56 also includes a second channel unit 60 to which the portion 54 of the link 40 from the channel bank 48 is coupled.

The first and second channel units 58 and 60 enable the portions 52 and 54 of the link 40 to be electronically cross-connected via a matrix or other components within the IDST 50, to provide a fail-safe path for the LMT 56, and to provide monitoring and testing access functions such as by coupling to external monitor and test equipment. At the same time, the first and second channel units 58 and 60 provide a metallic through connection between the portions 52 and 54 of the link 40, such as by use of relay switches 62 which are normally closed when the relay is unenergized. Switches 62 correspond to the blocks 38 in FIG. 1. This maintains the signal path of the link 40 through the portions 52 and 54 thereof under any fault condition. At the same time, the relay can be energized to open the switches 62 and thereby separate the portions 52 and 54 of the link 40 except for any electronic interconnection therebetween. In this manner, signals can be inserted in series with the link 40 for in-depth link testing and analysis.

As shown in FIG. 3, the first channel unit 58 includes a dataport 64 coupled to the portion 52 of the link 40 by a relatively high impedance 66. The second channel unit 60 includes a dataport 68 coupled to the portion 54 of the link 40 through a relatively high impedance 70. The high impedances 66 and 70 serve to isolate the dataports 64 and 68 from the link 40, such that the IDST 50 with its LMT 56 appears virtually transparent to the link 40. At the same time, the high impedances 66 and 70 provide for electronic coupling of the portions 52 and 54 of the link 40 to the dataports 64 and 68. As described hereafter, the dataports 64 and 68 can assume different forms, as appropriate, and can comprise, for example, DSO dataports.

The LMT 56 provides a test interface which allows for monitoring of links such as the link 40 in a non-obtrusive manner. At the same time, the metallic through connection provided by the relay switches 62 enables signals to be inserted in series into the link 40 for in-depth link testing and analysis. The normally closed relay switches 62 maintain the signal path of the link 40 under any fault condition, including common equipment failures, A and B battery feed loss, composite clock feed loss, and the like.

Figure 4:
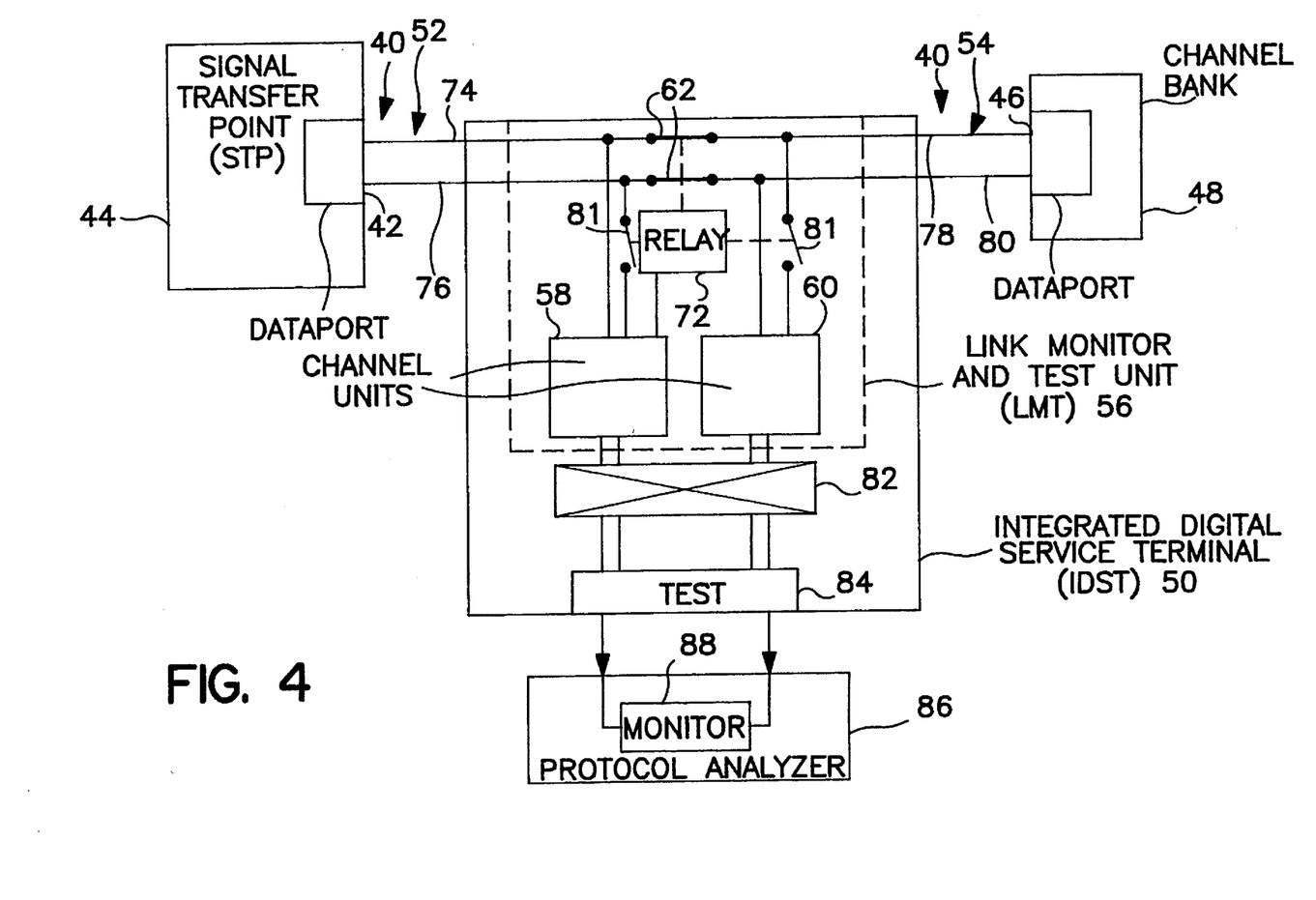
FIG. 4 is a somewhat more detailed block diagram of the arrangement of FIG. 3 showing a monitor mode of operation.

The normally closed relay switches 62 enable the arrangement shown in FIG. 3 to operate in two different modes. In an LMT monitor mode, which is shown in FIG. 4, a relay 72 associated with the relay switches 62 maintains the switches 62 in a closed position when not energized. This couples conductors 74 and 76 comprising the portion 52 of the link 40 directly to conductors 78 and 80 comprising the portion 54 of the link 40. At the same time, the relay 72 opens relay switches 81 to disconnect transmitters of the channel units 58 and 60 from the dataports 42 and 46. The high impedances 66 and 70 (FIG. 3) within the first and second channel units 58 and 60 function to isolate the link 40 and make the channel units 58 and 60 essentially transparent thereto. At the same time electronic coupling of the portions 52 and 54 of the link 40 to the channel units 58 and 60 is possible. Also, the channel units 58 and 60 can be electronically cross-coupled as well as being coupled to other components within the IDST 50. As shown in FIG. 4, the channel units 58 and 60 are coupled through a matrix 82 of the IDST 50 to each other and to a test interface 84 of the IDST 50. The test interface 84 is coupled to a protocol analyzer 86 having a monitor 88 capable of monitoring the link 40 in transparent, non-obtrusive fashion.

Figure 5:
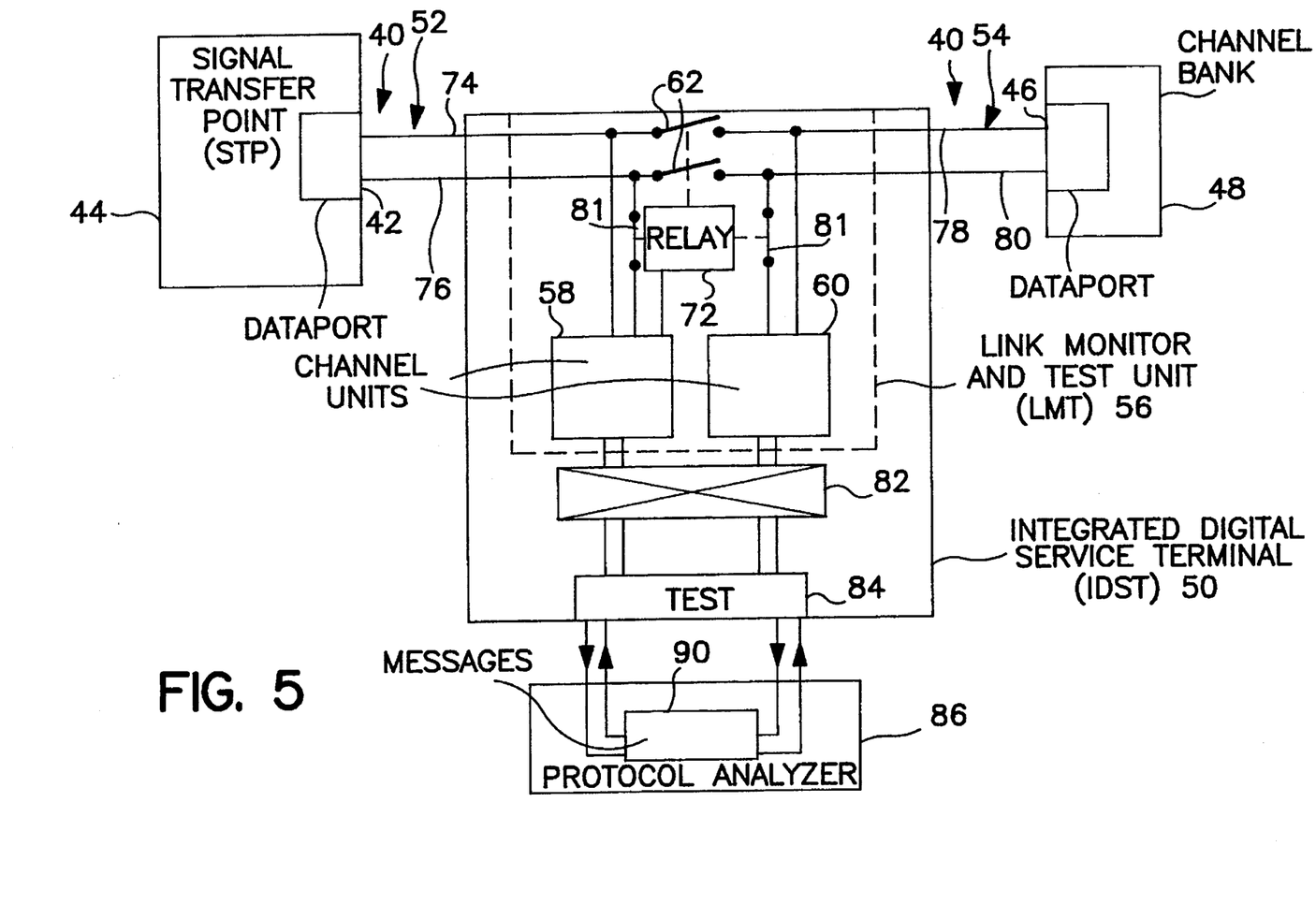
FIG. 5 is a somewhat more detailed block diagram of the arrangement of FIG. 3 showing a split mode of operation.

The arrangement of FIG. 3 is also capable of being operated in an LMT split mode, which is shown in FIG. 5. In the LMT split mode, the relay 72 is energized to open the relay switches 62 and thereby uncouple the conductors 74 and 76 of the link portion 52 from the conductors 78 and 80 of the link portion 54. At the same time, the relay 72 closes the relay switches 81 so that the LMT 56 can drive the lines. The link portion 52 is electronically coupled to the channel unit 58, and the link portion 54 is electronically coupled to the channel unit 60. The channel units 58 and 60 can be electronically cross-coupled as well as coupled to the test interface 84 by the matrix 82 within the IDST 50. In this situation, the protocol analyzer 86 includes messages 90 which may be inserted into the link 40 for in-depth link testing and analysis.

Figure 6:
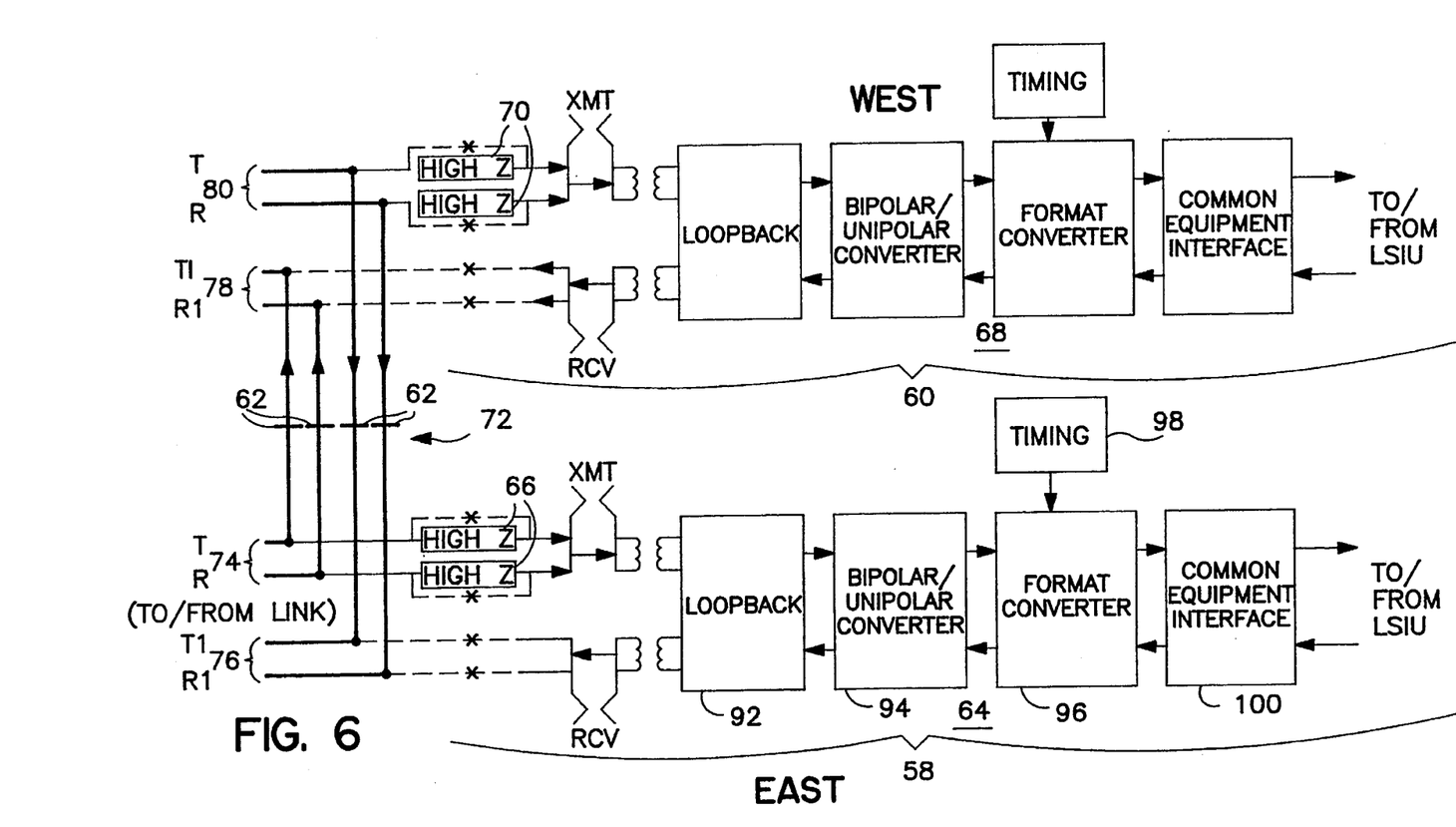
FIG. 6 is an even more detailed diagram, partially in block and partially in schematic form, of the link monitor and test unit of the arrangement of FIG. 3.

FIG. 6 comprises a detailed example of the LMT 56. As shown therein, the conductors 74, 76, 78 and 80 comprise pairs of wires extending through the relay switches 62 of the relay 72. The relay switches 62 are represented by break lines in FIG. 6, for simplicity of illustration.

The first channel unit 58 includes the dataport 64 and the high impedance 66 which couples the conductor 74 to the dataport 64 through face plate jacks XMT which provide for local plug-in where desired. Additional face plate jacks RCV are also present, and may be used to couple the dataport 64 to the conductor 76. The dataport 64 comprises a conventional DSO dataport in the present example, and includes a loop back circuit 92 coupled between the face plate jacks XMT and RCV and a bipolar/unipolar converter 94. The converter 94 is coupled through a format converter 96, coupled to a timing circuit 98, to a common equipment interface 100 for interfacing with an LSIU forming part of the matrix 82 of the IDST 50. The dataport 64 includes a microprocessor which performs a number of functions including operation of the relay 72 to open and close the relay switches 62. The relay 72 can assume any appropriate form such as a hermetically sealed relay.

As shown in FIG. 6, the second channel unit 60 is of like construction to the first channel unit 58 and includes the high impedance 70, face plate jacks XMT and RCV and the dataport 68. The dataports 64 and 68 are shown as DSO dataports in the example of FIG. 6, but can comprise other components such as office channel unit dataports (OCUDPs) where desired. The first and second channel units 58 and 60 are respectively labeled "east" and "west" for ease of reference.

Figure 7:
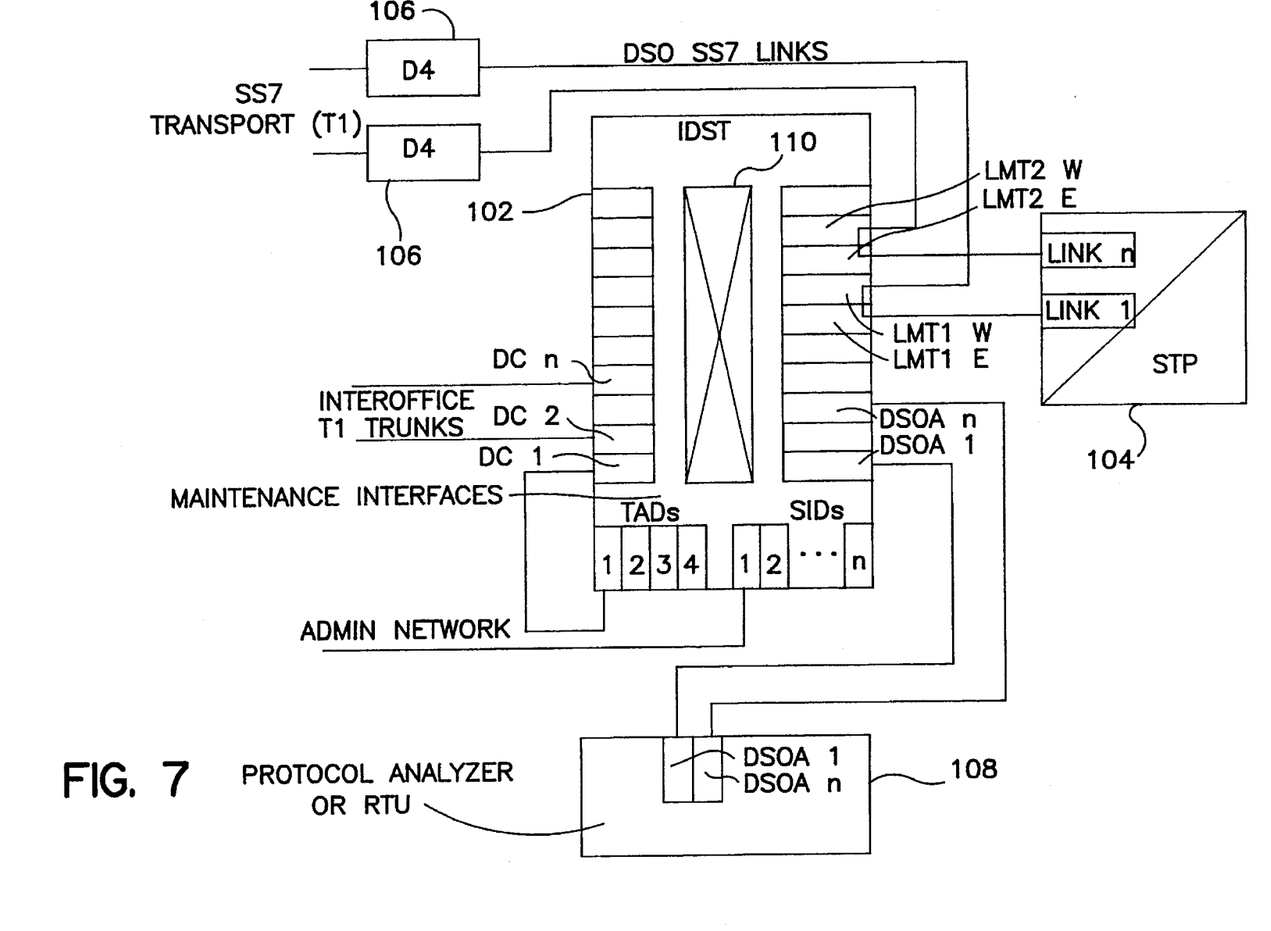
FIG. 7 is a block diagram of a portion of a signalling system in which an integrated digital service terminal having a plurality of link monitor and test units in accordance with the invention is employed to couple a signal transfer point to a plurality of channel banks.

FIG. 7 illustrates an arrangement in which an IDST 102 employing a plurality of LMTs in accordance with the invention is used to couple an STP 104 to a plurality of D4 dataports 106. The STP 104 is coupled to n links comprising link 1–link n. Link 1 extends through the "east" side of an LMT, designated LMT1E, and then into the west side of the LMT designated, LMT1W, before continuing on to a D4 channel bank 106. The other links from the STP 104 extend through the east and west sides of other LMTs in similar fashion. The LMTs form loop interfaces together with a plurality of DSO dataports, designated DSOA1–DAOAn. The DSO dataports couple the loop interfaces to a protocol analyzer or RTU 108.

The IDST 102 includes a matrix 110 for coupling the loop interfaces to other interfaces within the IDST, including T1 interfaces, TADs and SIOs. The T1 interfaces, designated DC1–DCn, interface with interoffice T1 trunks. They may also be coupled to the TADs comprising a test access die group. The SIOs, or system input/output ports, provide serial access and are coupled to an administrative network.

The administrative network provides human instructions for communication, and includes instructions for data communication between the LMTs and the DSOA dataports. The interoffice T1 trunks enable link traffic at other STPs to be observed and access to link traffic to be gained at remote locations. Again, the LMTs allow for monitoring and testing of the links between the STP 104 and the D4 channel banks 106 using the protocol analyzer or RTU 108 as well as the various components within the IDST 102.

Figure 8:
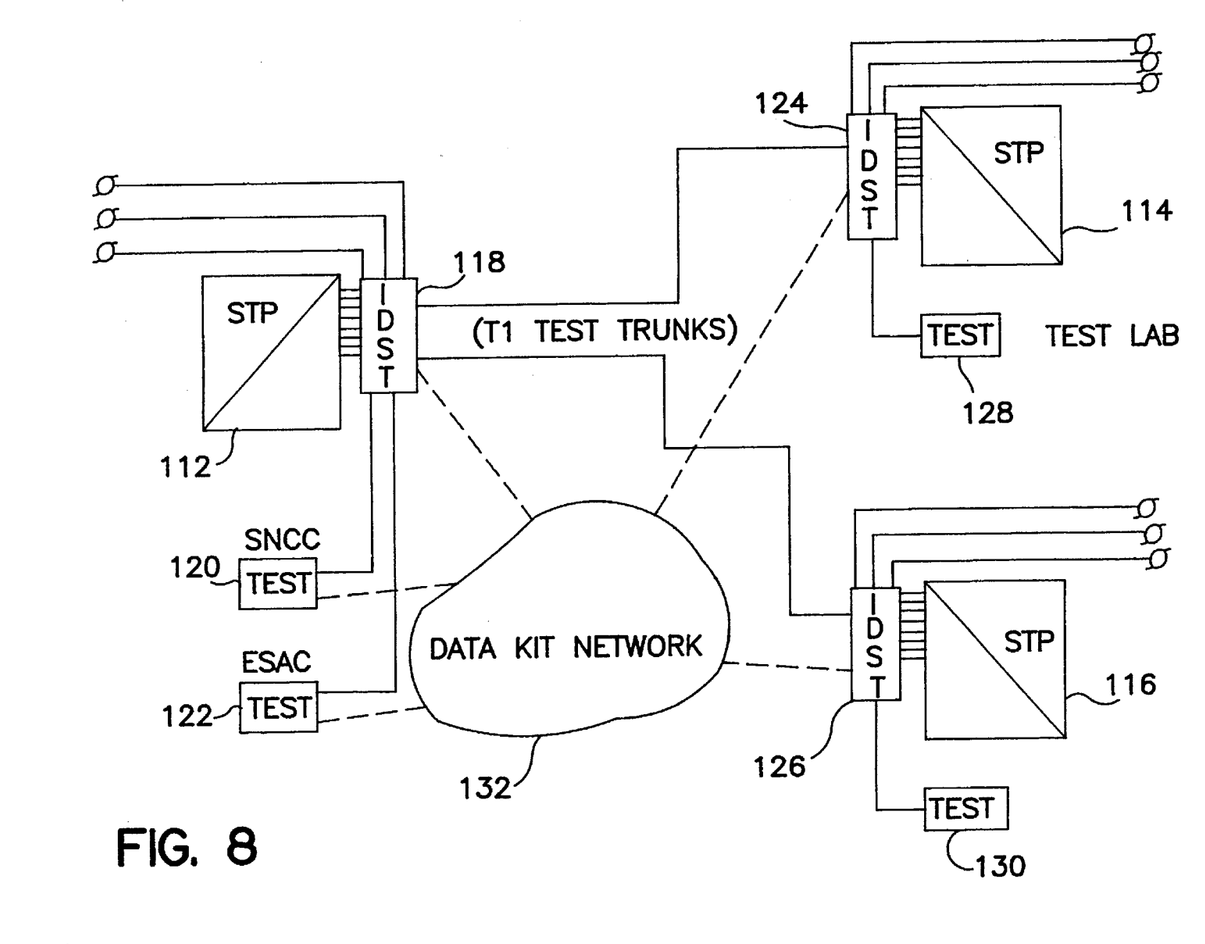
FIG. 8 is a block diagram of a portion of a signalling system in which a plurality of signal transfer points are interconnected, in conjunction with integrated digital service terminals, and in which monitoring and testing in accordance with the invention may be accomplished.

FIG. 8 shows a portion of a signalling system including a plurality of STPs 112, 114 and 116. The STP 112 is coupled through an IDST 118 to SNCC and ESAC test units 120 and 122. The IDST 118 also couples the STP 112 through T1 test trunks to an IDST 124 associated with the STP 114 and to an IDST 126 associated with the STP 116. The IDST 124 also couples the STP 114 to a test lab test unit 128. The IDST 126 couples the STP 116 to a test unit 130.

A data kit network 132 comprises one particular network for controlling the various test units 120, 122, 128 and 130. The data kit network 132 determines link monitoring and testing within the various IDSTs 118, 124 and 126 under the control of the test units 120, 122, 128 and 130. As previously described in connection with FIGS. 4 and 5, the relay 72 of each LMT 56 controls the positions of the relay switches 62 to either close or open the link. The relay 72 connects the opposite first and second or east and west channel units 58 and 60 through a metallic path, when in an unoperated or non-energized state. In this manner, link or circuit connectivity is maintained through the channel units 58 and 60 in the event of a loop shelf or complete system power outage. In addition to the relay connection, a cross-connect is established by the matrix 82 of the IDST 50 to connect the electronic halves of the LMT 56. This provides an additional fail-safe path for the LMT and is necessary to provide the monitor test access function.

Because the relay switches 62, which are opened to provide in-depth testing, should not be opened so as to break the link except when it is safe to do so, a number of safeguards are provided. For one thing, the IDST provisioning system establishes protected modes for the relays of the LMTs. Only those LMTs which are not in a protected state may have their relays energized to open the relay switches. If a user issues one or more commands that can operate the relay of an LMT in the protected state, such a request is denied. A message to operate the relay of an LMT is entered at an administrative port and is parsed by an MS for accuracy. If the message contains the proper command syntax, then it is passed on the appropriate task for further checks. That task verifies that the request meets the security requirements for a particular user and is consistent with the current database for the particular LMT. If all checks pass, then a message is sent to a slave MS which in turn performs its own checks. Only after both the MS and the slave MS validate the message will the message be sent to the LSIU for further processing. The LSIU validates the request against the database thereof, and in turn causes the microprocessor within the first or east channel unit 58 of the LMT to energize the relay 72 and open the relay contacts 62.

At a low level throughout this process, each of the message transfers contains CRC validation of the individual message packets. If the message becomes corrupt, the receiving element reports the failure back to the sending element, and the request is denied.

A redundant cross-connect is also provided for. Should the relay 72 be operated in a manner inconsistent with the IDST database, then the test access cross-connect through the matrix 82 delays the connection. The IDST runs continuous database verification. When an inconsistency is determined, the relay 72 is released.

Communication failure time-out can be provided for, if non-latching relays are used. In that event, if the LSIU loses communication with the MS for any reason, all operated relays are released. This is done to ensure that the system is in a defined state in the event of a major system failure. If any errors are made on individual relay status, the errors are on the side of releasing the relay to close the switches thereof.

While the invention has been particularly shown and described with reference to preferred embodiments thereof, it will be understood by those skilled in the art that various changes in form and details may be made therein without departing from the spirit and scope of the invention.

We claim:

1. Apparatus for introduction into a link in a communication network signaling system, comprising a terminal for serial coupling in a link between opposite first and second portions of the link, the terminal including a first channel unit for coupling to the first portion of the link, a second channel unit for coupling to the second portion of the link, and means for coupling the first channel unit to the second channel unit, the first channel unit having a first data port and a first high impedance for coupling the first data port to the first portion of the link, and the second channel unit having a second data port and a second high impedance for coupling the second data port to the second portion of the link.

2. The invention set forth in claim 1, wherein the means for coupling is capable of selectively uncoupling the first channel unit from the second channel unit.

3. The invention set forth in claim 1, further including test equipment coupled to the first and second data ports for testing the link.

4. The invention set forth in claim 3, wherein the test equipment includes a matrix coupled to the first and second data ports and a protocol analyzer coupled to the matrix and including a monitor.

5. For use in an integrated digital service terminal serially coupled in a link between a signal transfer point and a channel bank in a communication network signaling system, a link monitor and test unit comprising a first channel unit for coupling to a signal transfer point through a link, a second channel unit for coupling to a channel bank through the link, and means for selective coupling of the first channel unit to the second channel unit.

6. The invention set forth in claim 5, wherein the means for selective coupling comprises a plurality of normally closed, relay operated switch contacts.

7. The invention set forth in claim 5, wherein each of the first and second channel units comprises a data port coupled to the link through a high impedance.

8. Communication network signalling apparatus comprising the combination of:

a signal transfer point;

a channel bank;

a switching arrangement;

a link coupling the signal transfer point to the channel bank through the switching arrangement; and monitor and test apparatus coupled to the link in parallel with the switching arrangement and including first and second channel units coupled to the link at opposite sides of the switching arrangement and test equipment coupled to the first and second channel units for testing the link.

9. The invention set forth in claim 8, wherein the switching arrangement comprises a plurality of normally closed, relay operated switch contacts.

10. The invention set forth in claim 8, wherein the switching arrangement comprises a plurality of switch contacts for selectively opening and closing the link between the first and second channel units under the control of one of the first and second channel units.

11. The invention set forth in claim 10, wherein each of the first and second channel units includes a data port coupled to the link through a high impedance.

12. The invention set forth in claim 11, wherein the switching arrangement and the monitor and test apparatus comprise part of an integrated digital service terminal having a matrix coupled to the first and second channel units, and further including a protocol analyzer coupled to the matrix and including a link monitor.

13. A method of monitoring and testing a link in a communication network signalling system, the link being separated into first and second portions, comprising the steps of:

coupling first and second channel units to the first and second portions of the link, respectively;

coupling the first and second channel units together to maintain a signal path through the link when a first operating condition exists within the link; and monitoring the link when the first and second channel units are coupled together.

14. A method according to claim 13, comprising the further steps of:

uncoupling the first and second channel units when a second operating condition exists within the link; and testing the link while the first channel unit is uncoupled from the second channel unit.

15. A method according to claim 14, wherein the step of testing the link while the first channel unit is uncoupled from the second channel unit includes the step of inserting messages into the link for testing and analysis of the link.

16. A method of monitoring and testing a link in a communication network signaling system, comprising the steps of:

serially coupling first and second channel units within the link;

coupling the first and second channel units together to monitor the link when a first operating condition exists within the link; and uncoupling the first and second channel units to open the link when a second operating condition exists within the link.

17. A method according to claim 16, comprising the further step of coupling test equipment to the first and second channel units to test the link when the link is opened.

18. A method according to claim 17, wherein the step of coupling test equipment to the first and second channel unit to test the link when the link is opened includes the step of serially inserting signals into the link from the test equipment for in-depth testing and analysis of the link.

* * * * *